O. MOYNIHAN.
STRIPPING REEL.
APPLICATION FILED APR. 14, 1920.
1,415,678.
Patented May 9, 1922.
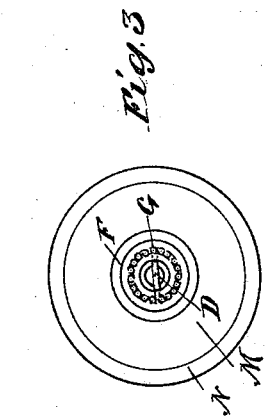
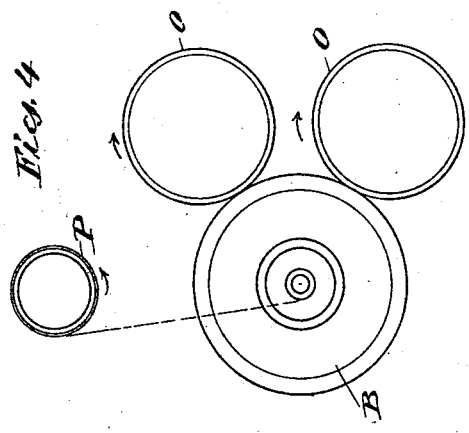
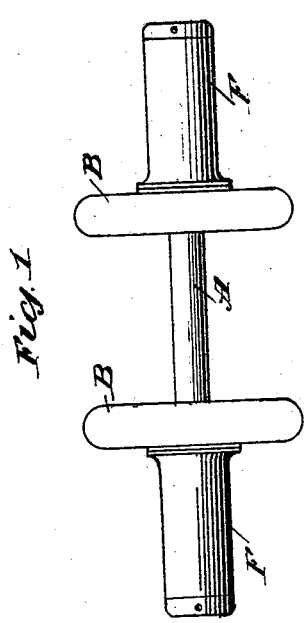
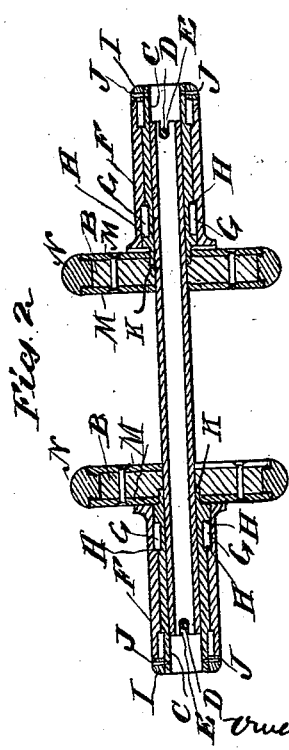
INVENTOR.
ATTORNEY.

UNITED STATES PATENT OFFICE.

OWEN MOYNIHAN, OF CLEVELAND, OHIO.

STRIPPING REEL.

1,415,678.  Specification of Letters Patent.  Patented May 9, 1922.

Application filed April 14, 1920. Serial No. 373,717.

*To all whom it may concern:*

Be it known that I, OWEN MOYNIHAN, a citizen of the United States, and resident of Cleveland, in the county of Cuyahoga and State of Ohio, have invented certain new and useful Improvements in Stripping Reels, of which I hereby declare the following to be a full, clear, and exact description, such as will enable others skilled in the art to which it appertains to make and use the same.

The objects of this invention are to provide stripping reels, upon which the fabric bandages with which the laminated inner tubes of pneumatic tires are wound, to compress them tightly while being vulcanized, can be stored for future use.

The advantages of the employment of the reel are found in the preservation of the bandages from dirt and dust, and the elimination of manual labor in several ways. First—the removing the bandages by hand; second—the gathering them from the floor; and third—rewinding them on a spindle by means of a rewinding machine to place them in condition for re-use.

By means of this improvement, the bandages are always in condition for use, and the production of inner tubes is speeded up and much simplified.

The invention includes a portable reel adapted to be held by the hands and employed in conjunction with the mandrels of a tube lathe, upon which the inner tube has been wound, and compressed by means of a long strip of bandage or binding tape. Means in the reel are also employed for rotating the same by frictional application, to idle mandrels rotatably mounted in the lathe and operatively connected with the movements of the lathe.

The invention comprises a spindle, spaced discs or rims rotatable with the spindle, holding means including bearings in which the spindle moves, and driving means or members upon the circumferential margins of said discs, which by application to the peripheries of said idlers will cause the spindle to revolve and wind the tape thereon.

Owing to the customary construction of the tube lathe, two idle mandrels without tape can be used to drive and guide the discs as the spindle is moved longitudinally along said idle mandrels and a third mandrel or the one upon which the tube is wound and wrapped, will be found to be conveniently located so that one end of the tape thereon can be applied directly to the reel spindle, and as the spindle revolves, the tape will be compactly wound upon the spindle.

The direction of movement of the spindle will also be the reverse of that of the mandrels.

The invention is illustrated in the accompanying drawings, hereinafter further described and specifically pointed out in the claims.

In the accompanying drawings Fig. 1 is a side elevation of the device; Fig. 2 is a longitudinal section of the same; Fig. 3 is an end elevation and Fig. 4 is a diagrammatic view showing the method of applying the manually held reel to the lathe mandrels.

In these views A is the spindle upon which are mounted two discs, B, B, which form the end flanges of the reel and which revolve therewith. Upon the extremities of the spindle are shown the sleeves C, C, which are detachably secured to the spindle by means of pins D, D, passing through the open slots E, E, at the extremities of said spindle. F, F, are loosely mounted sleeves mounted upon the sleeves C, C, upon rollers G, G, which move in the annular bearings H, H, formed in both inner and outer sleeves.

The outer sleeves F, F, and rollers are secured in place by means of the terminal ring plates I, and transverse screws or pins J, J, so that when these pins are removed, the outer sleeves can be removed to assemble the rollers in place. The discs are retained in place by means of the inner sleeves, C, C, the pins D, D, which determine the space between them, and the inner sleeves are provided with the extremities K, K, which enter the reels, which are a tight fit thereon.

The reels are each composed of a wooden body L, sheet metal side plates M, M, and the rubber rims N, which when applied to the mandrels, O, O, of the lathe cause the reel to revolve rapidly and when the band wound upon the third mandrel P is applied to the reel, it will be rapidly rewound thereon, in the neatest possible manner.

Having described the invention what I claim as new and desire to secure by Letters Patent is:

1. In a reel for the purpose described, a spindle, spaced discs mounted thereon and revolvable therewith, said discs provided with friction margins, a sleeve detachably secured to said spindle at each end, and outer sleeves adapted to be held by the hands, said spindle and inner sleeves rotatable within said outer sleeves.

2. In a reel for the purpose described, a spindle, spaced discs mounted thereon and revolvable therewith, said discs provided with friction margins, a sleeve detachably secured to said spindle at each end, and outer sleeves adapted to be held by the hands, said spindle and inner sleeves rotatable within said outer sleeves and means for detachably securing the outer sleeves to the said inner sleeves and the said inner sleeves to said spindle.

3. In a reel for the purpose described, in combination, a spindle, discs spaced thereon, each disc provided with circumferential driving means, a sleeve detachably secured to each extremity of said spindle and engaging said discs, said sleeves and discs rotatable with said spindle, securing pins for said sleeves, said pins serving as stops limiting the amount of space between said discs.

In testimony whereof, I hereunto set my hand this 13th day of March, 1920.

OWEN MOYNIHAN.

In presence of—
   CHAS. F. SIPE,
   WM. M. MONROE.